United States Patent
Li

(10) Patent No.: US 9,918,354 B2
(45) Date of Patent: Mar. 13, 2018

(54) METHOD AND APPARATUS FOR PROCESSING SERVICE OF WIRELESS COMMUNICATIONS

(71) Applicant: ZTE Corporation, Shenzhen (CN)

(72) Inventor: Bo Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 117 days.

(21) Appl. No.: 15/031,830

(22) PCT Filed: May 21, 2014

(86) PCT No.: PCT/CN2014/078058
§ 371 (c)(1),
(2) Date: Aug. 8, 2016

(87) PCT Pub. No.: WO2015/058520
PCT Pub. Date: Apr. 30, 2015

(65) Prior Publication Data
US 2016/0374140 A1   Dec. 22, 2016

(30) Foreign Application Priority Data
Oct. 25, 2013 (CN) .......................... 2013 1 0514096

(51) Int. Cl.
*H04W 76/04* (2009.01)
*H04W 76/02* (2009.01)
(Continued)

(52) U.S. Cl.
CPC ......... *H04W 76/046* (2013.01); *H04W 36/16* (2013.01); *H04W 76/002* (2013.01);
(Continued)

(58) Field of Classification Search
CPC . H04W 76/046; H04W 36/16; H04W 76/002; H04W 76/02
See application file for complete search history.

(56) References Cited

U.S. PATENT DOCUMENTS

| 8,270,369 B1 * | 9/2012 | Chang ................... H04W 36/02 370/254 |
| 2009/0010236 A1 * | 1/2009 | Aramaki ........... H04W 36/0033 370/338 |

(Continued)

FOREIGN PATENT DOCUMENTS

| CN | 102223714 A | 10/2011 |
| CN | 102595386 A | 7/2012 |
| CN | 103124415 A | 5/2013 |

OTHER PUBLICATIONS

International Search Report for corresponding application PCT/CN2014/078058 filed on May 21, 2014; dated August 6, 2014.

*Primary Examiner* — Chi H Pham
*Assistant Examiner* — Weibin Huang
(74) *Attorney, Agent, or Firm* — Cantor Colburn LLP

(57) ABSTRACT

The disclosure provides a method and apparatus for processing service of wireless communications. The method includes that: a network side receives a request message which is sent by a terminal and used for creating a service (S102); after determining that the terminal is in a handover process, the network side notifies the terminal to delay the creation of the service (S104); and after the handover process is completed, the network side receives the request message which is resent by the terminal, and creates the service (S106). The disclosure solves the problem that when handover process is carried out, a User Equipment (UE) cannot ensure that a service is initiated normally, thereby ensuring that the service which is initiated in a handover
(Continued)

process can be initiated normally and is not affected because of the handover process, and improving the user experience.

20 Claims, 6 Drawing Sheets

(51) Int. Cl.
*H04W 76/00* (2018.01)
*H04W 36/16* (2009.01)
*H04W 84/08* (2009.01)
*H04L 5/16* (2006.01)

(52) U.S. Cl.
CPC ............... *H04W 76/02* (2013.01); *H04L 5/16* (2013.01); *H04W 84/08* (2013.01)

(56) References Cited

U.S. PATENT DOCUMENTS

| | | | | |
|---|---|---|---|---|
| 2012/0177005 | A1* | 7/2012 | Liang | H04W 8/02 370/331 |
| 2013/0287007 | A1* | 10/2013 | Wu | H04W 36/0022 370/331 |
| 2014/0256326 | A1* | 9/2014 | Morgan | H04W 36/0016 455/437 |
| 2014/0349694 | A1* | 11/2014 | Raghothaman | H04W 36/00 455/509 |
| 2014/0373124 | A1* | 12/2014 | Rubin | H04L 67/28 726/7 |

* cited by examiner

METHOD AND APPARATUS FOR PROCESSING SERVICE OF WIRELESS COMMUNICATIONS

TECHNICAL FIELD

The disclosure relates to the field of communications, and in particular to a method and apparatus for processing a service of wireless communications.

BACKGROUND

In wireless communications, two types of services may coexist generally. For example, a trunking communication service and a common service coexist probably. The problems which may be caused by the coexistence of two types of services in the wireless communications are explained below by taking the above-mentioned two specific types of services as an example.

The trunking communication service is a half-duplex bidirectional service and realizes one-to-many communications. The characteristics of the trunking communication service is that one user is talking while one or more users are listening. After users who need to talk initiates talk permission requests, a network decides who can obtain a talk permission in accordance with a certain seizing policy. This user who obtains the talk permission will become a talk user, and other users in a trunking group will become listen users. Thus, the talk permission can be repeatedly exchanged to make the users in the trunking group talk and communicate until this trunking call is ended.

A trunking system is frequently used in the fields of emergency, job scheduling, traffic guidance and the like. In a using process of trunking User Equipment (UE), the trunking UE will frequently move from one cell to another cell. In a system supporting concurrence of a Long Term Evolution (LTE) common service and a trunking service, LTE common services and trunking talk users have Radio Resource Control (RRC) links, while trunking listen users do not have the RRC links.

In the case that the UE moves within a cell, there is a scene, in which the RRC links exist, in a handover process controlled by a network side. In the handover process, it cannot be ensured that a service initiated during the handover process is initiated normally in the relevant art.

SUMMARY

The embodiments of the disclosure provide a method and apparatus for processing service of wireless communications, which are intended to at least solve the problem in the relevant art that a UE cannot ensure that a service is initiated normally when handover is carried out.

According to one embodiment of the disclosure, a method for processing service of wireless communications is provided, which may include that: a network side receives a request message which is sent by a terminal and used for creating a service; after determining that the terminal is in a handover process, the network side notifies the terminal to delay the creation of the service; and after the handover process is completed, the network side receives the request message which is resent by the terminal, and creates the service.

In an embodiment of the disclosure, the step that the network side receives the request message which is sent by the terminal may include that: it is determined that the handover process is carried out under a condition that the network side has created another service with the terminal; and in the handover process, the network side receives the request message which is sent by the terminal.

In an embodiment of the disclosure, the step that the network side receives the request message which is sent by the terminal may include that: the network side receives the request message which is sent by the terminal through an RRC link of the other service.

In an embodiment of the disclosure, the service may be a trunking service, and the other service may be a non-trunking service; or the service may be a non-trunking service, and the other service may be a trunking service.

According to another embodiment of the disclosure, a method for processing service of wireless communications is also provided, which may include that: a terminal sends a request message to a network side, wherein the request message is used for creating a service; the terminal receives a notice from the network side, and caches the request message according to the notice to delay the creation of the service, the notice is sent by the network side after determining that the terminal is in a handover process; and after the handover process is completed, the terminal resends the request message to the network side.

In an embodiment of the disclosure, the step that the terminal sends the request message to the network side may include that: the terminal sends the request message to the network side in the handover process, the handover process is carried out under a condition that the terminal has created another service with the network side.

In an embodiment of the disclosure, the step that the terminal sends the request message to the network side may include that: the terminal sends the request message to the network side through an RRC link of the other service.

In an embodiment of the disclosure, the service may be a trunking service, and the other service may be a non-trunking service; or the service may be a non-trunking service, and the other service may be a trunking service.

In an embodiment of the disclosure, the method may further include that: after the handover process fails or a protection timer is overtime, the terminal deletes the cached request message, and notifies that the creation of the service fails.

According to another embodiment of the disclosure, an apparatus for processing service of wireless communications is also provided, which may be located at a network side and may include: a receiving component, configured to receive a request message which is sent by a terminal and used for creating a service; a notification component, configured to notify the terminal to delay the creation of the service after determining that the terminal is in a handover process; and a creation component, configured to receive the request message which is resent by the terminal, and create the service, after the handover process is completed.

In an embodiment of the disclosure, the receiving component may be configured to determine that the handover process is carried out under a condition that the receiving component and the terminal have created another service, and receive the request message which is sent by the terminal in the handover process.

In an embodiment of the disclosure, the receiving component may be configured to receive the request message which is sent by the terminal through an RRC link of the other service.

In an embodiment of the disclosure, the service may be a trunking service, and the other service may be a non-trunking service; or the service may be a non-trunking service, and the other service may be a trunking service.

According to another embodiment of the disclosure, a apparatus for processing service of wireless communications is also provided, which may be located at a terminal and may include: a sending component, configured to send a request message to a network side, wherein the request message is used for creating a service; a caching component, configured to receive a notice from the network side, and cache the request message by the terminal according to the notice to delay the creation of the service, wherein the notice is sent by the network side after determining that the terminal is in a handover process; and the sending component, configured to resend the request message to the network side after the handover process is completed.

In an embodiment of the disclosure, the sending component may be configured to send the request message to the network side in the handover process, the handover process is carried out under a condition that the terminal has created another service with the network side.

In an embodiment of the disclosure, the sending component may be configured to send the request message to the network side through an RRC link of the other service.

In an embodiment of the disclosure, the service may be a trunking service, and the other service may be a non-trunking service; or the service may be a non-trunking service, and the other service may be a trunking service.

In an embodiment of the disclosure, the apparatus may further include: a deletion component, configured to delete the cached request message by the terminal and notify that the creation of the service fails after the handover process fails or a protection timer is overtime.

By means of the embodiments of the disclosure, the problem that a UE cannot ensure that a service is initiated normally when handover is carried out is solved by delaying the creation of the service in a handover process, thereby ensuring that the service which is initiated in the handover process can be initiated normally and is not affected because of the handover process, and improving the user experience.

BRIEF DESCRIPTION OF THE DRAWINGS

The drawings described here are intended to provide further understanding of the disclosure, and form a part of the disclosure. The schematic embodiments and descriptions of the disclosure are intended to explain the disclosure, and do not form improper limits to the disclosure. In the drawings.

DETAILED DESCRIPTION OF THE EMBODIMENTS

It is important to note that the embodiments of the disclosure and the characteristics in the embodiments can be combined under a condition of no conflicts. The disclosure is described below with reference to the drawings and the embodiments in detail.

Figure 1:
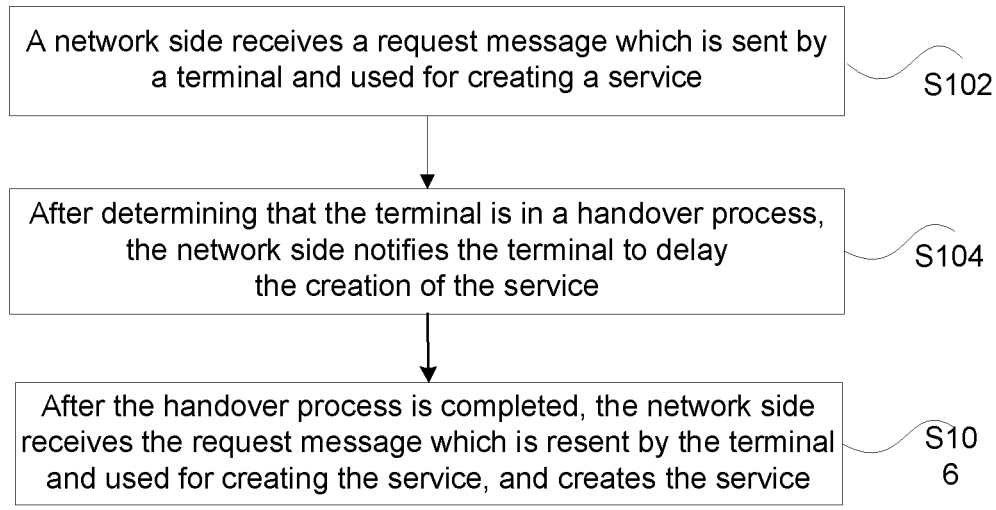
FIG. 1 is a flowchart 1 of a method for processing service of wireless communications at a network side according to an embodiment of the disclosure.

FIG. 1 is a flowchart 1 of a method for processing service of wireless communications at a network side according to an embodiment of the disclosure. As shown in FIG. 1, the flowchart includes the steps as follows.

Step S102: A network side receives a request message which is sent by a terminal and used for creating a service.

Step S104: After determining that the terminal is in a handover process, the network side notifies the terminal to delay the creation of the service.

Step S106: After the handover process is completed, the network side receives the request message which is resent by the terminal and used for creating the service, and creates the service.

By means of the steps, the network side notifies a client to delay the creation of a service for wireless communications, receives a service creation request again after handover is completed, and creates the service according to the request message. The problem that when handover is carried out, a UE cannot ensure that the service is initiated normally, thereby ensuring that the service which is initiated in the handover process can be initiated normally and is not affected because of the handover process, and improving the user experience.

In an embodiment of the disclosure, it is determined that the handover process may be carried out under a condition that the network side has created another service with the terminal; and in the handover process, the network side receives the request message which is sent by the terminal and used for creating the service. Under this condition, as a preferred implementation mode, the network side may receive the request message which is sent by the terminal and used for creating the service through an RRC link of the other service.

In an embodiment of the disclosure, the service is a trunking service, and the other service is a non-trunking service; or the service is a non-trunking service, and the other service is a trunking service.

Figure 2:
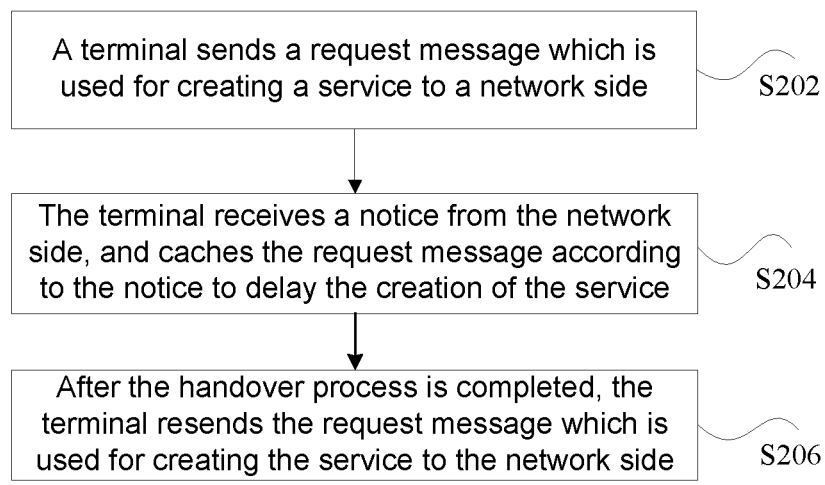
FIG. 2 is a flowchart 2 of a method for processing service of wireless communications at a user side according to an embodiment of the disclosure.

FIG. 1 shows a description from the network side, and explanations are performed below from a terminal side. FIG. 2 is a flowchart 2 of a method for processing service of wireless communications at a user side according to an embodiment of the disclosure. As shown in FIG. 2, the flowchart includes the steps as follows.

Step S202: A terminal sends a request message which is used for creating a service to a network side.

Step S204: The terminal receives a notice from the network side, and caches the request message according to the notice to delay the creation of the service, wherein the notice is sent by the network side after determining that the terminal is in a handover process.

Step S206: After the handover process is completed, the terminal resends the request message which is used for creating the service to the network side.

By means of the steps, the terminal finds out that the network side is in the handover process, caches the request message which is used for creating the service, and re-initiates a service creation request after handover is completed. The problem that when handover is carried out, a UE cannot ensure that the service is initiated normally, thereby ensuring that the service which is initiated in the handover process can be initiated normally and is not affected because of the handover process, and improving the user experience.

In an embodiment of the disclosure, in Step S202, the terminal sends the request message to the network side in the handover process, the handover process is carried out under a condition that the terminal has created another service with the network side. By means of the preferred implementation mode, the problem of concurrence of services can be solved. As another preferred implementation mode, the terminal sends the request message which is used for creating the service to the network side through an RRC link of the other service.

In an embodiment of the disclosure, the service is a trunking service, and the other service is a non-trunking service; or the service is a non-trunking service, and the other service is a trunking service.

In an embodiment of the disclosure, the terminal may also delete the cached request message and notify that the creation of the service fails after the handover process fails or a protection timer is overtime.

Figure 3:
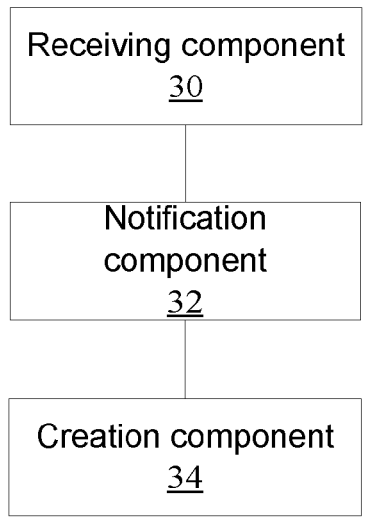
FIG. 3 is a structure diagram 1 of a service processing apparatus at a network side according to an embodiment of the disclosure.

FIG. 3 is a structure diagram 1 of a service processing apparatus at a network side according to an embodiment of the disclosure. The apparatus corresponds to the method in FIG. 1, which has been described and will not be repeated here. As shown in FIG. 3, the structure includes:

a receiving component 30, configured to receive a request message which is sent by a terminal and used for creating a service; a notification component 32, configured to notify the terminal to delay the creation of the service after determining that the terminal is in a handover process; and a creation component 34, configured to receive the request message which is resent by the terminal, and create the service, after the handover process is completed.

In an embodiment of the disclosure, the receiving component 30 is further configured to determine that the handover process is carried out under a condition that the receiving component and the terminal have created another service, and receive the request message which is sent by the terminal in the handover process. In an embodiment of the disclosure, the receiving component 30 is configured to receive the request message which is sent by the terminal through an RRC link of the other service.

Figure 4:
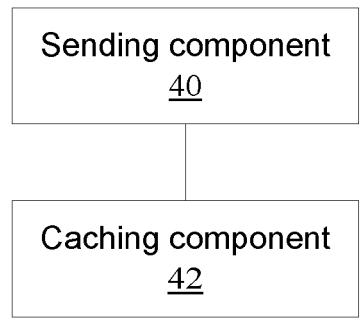
FIG. 4 is a structure diagram 2 of a service processing apparatus at a user side according to an embodiment of the disclosure.

FIG. 4 is a structure diagram 2 of a service processing apparatus at a user side according to an embodiment of the disclosure. The apparatus corresponds to the method in FIG. 2, which has been described and will not be repeated here. As shown in FIG. 4, the structure includes:

a sending component 40, configured to send a request message which is used for creating a service to a network side; a caching component 42, configured to receive a notice from the network side, and cache the request message by the terminal according to the notice to delay the creation of the service, wherein the notice is sent by the network side after determining that the terminal is in a handover process; and the sending component 40, further configured to resend the request message to the network side after the handover process is completed.

By means of the apparatus, the request message is cached in the handover process, and a service request is resent after the handover process is completed, and the terminal can create another service under a condition that the service has been created.

In an embodiment of the disclosure, the sending component 40 is further configured to send the request message to the network side in the handover process, the handover process is carried out under a condition that the terminal has created the other service with the network side. In an embodiment of the disclosure, the sending component 40 is configured to send the request message to the network side through an RRC link of the other service.

In an embodiment of the disclosure, the service is a trunking service, and the other service is a non-trunking service; or the service is a non-trunking service, and the other service is a trunking service.

Figure 5:
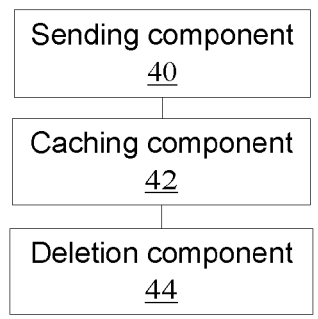
FIG. 5 is a preferred structure diagram of a service processing apparatus at a user side according to an embodiment of the disclosure.

FIG. 5 is a preferred structure diagram of a service processing apparatus at a user side according to an embodiment of the disclosure. As shown in FIG. 5, the apparatus may further include: a deletion component 44, configured to delete the cached request message by the terminal and notify that the creation of the service fails after the handover process fails or a protection timer is overtime.

Explanations are performed below with reference to an optional embodiment by taking an LTE system as an example.

In the optional embodiment, in a system supporting concurrence of an LTE service and a trunking service, an implementation mode is provided. Thus, it is ensured that a UE having an RRC link and a network side can correctly process a service to allow the service to be initiated smoothly without being affected by a handover process if other services are initiated in the handover process.

In the optional embodiment, the LTE common service has been created, the RRC link has existed, and the UE side reports a measurement report message according to measurement configuration information configured by the network side in the case that conditions for triggering reporting of a measurement report are satisfied. After the network side receives the measurement report, it is evaluated whether the measurement configuration information turned to a target cell needs to be issued. During the period of reporting of a measurement message and issuing of a handover configuration message at the network side, if the terminal initiates a trunking service creation request, the UE locally caches a direct transfer TConcurrentTrunkingRequest message on a Dedicated Control Channel (DCCH) through the RRC link due to the fact that the terminal and the network side already have the RRC link at this time. After the network side receives the TConcurrentTrunkingRequest message, if it is judged that the state of the network side is in a handover process, a TConcurrentDelay message is issued to the terminal, the network side notifies the UE side to delay a currently initiated service by means of the message, and a delaying reason is that the network side is in the handover process. After receiving the message, the terminal will send the previously cached TConcurrentTrunkingRequest message to a network via the DCCH after the handover process is completed, and delete the cache of the message. When the handover process is completed, the network side can carry out a corresponding trunking service creation process according to message request contents after receiving the TConcurrentTrunkingRequest message. In the handover process, if the handover process fails or a terminal protection timer is overtime, the UE will delete a local TConcurrentTrunkingRequest cache and notify an upper application of failure in a trunking service creation process at this time.

As another preferred implementation mode, an LTE trunking service has been created, an RRC link of a trunking talk user has existed, and the trunking talk user reports a measurement report message according to measurement configuration information configured by the network side if conditions for triggering reporting of a measurement report are satisfied. After the network side receives the measurement report, it is evaluated whether the measurement configuration information turned to a target cell needs to be issued. During the period of reporting of a measurement message and issuing of a handover configuration message at the network side, if the terminal initiates a link creation request for an LTE common service, the terminal locally caches a direct transfer TConcurrentLTERequest message on a DCCH through the RRC link due to the fact that the talk user and the network side already have the RRC link at this time. After the network side receives the TConcurrentLTERequest message, if it is judged that the state of the network side is in a handover process, a TConcurrentDelay message is issued to the terminal, the network side notifies the UE side to delay a currently initiated service by means of the message, and a delaying reason is that the network side is in the handover process. After receiving the message, the terminal will send the previously cached TConcurrentLTERequest message to a network via the DCCH after the handover process is completed, and delete the cache of the message. When the handover process is completed, the network side can carry out a corresponding LTE common service creation process according to message request contents after receiving the TConcurrentLTERequest message. In the handover process, if the handover process fails or a terminal protection timer is overtime, the UE will delete a local TConcurrentLTERequest cache and notify an upper application of failure in an LTE service creation process at this time.

Figure 6:
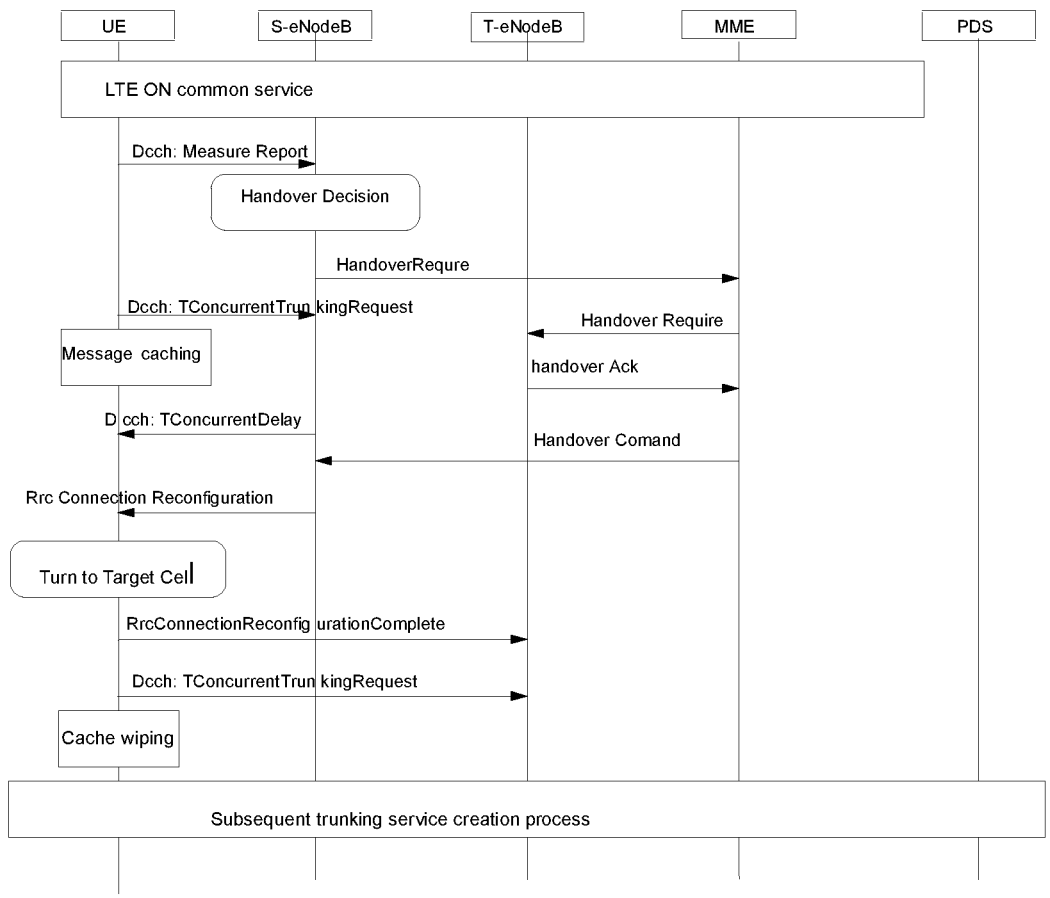
FIG. 6 is a flowchart of successful initiation of a trunking service in a handover process of an LTE common service according to a preferred embodiment of the disclosure.

FIG. 6 is a flowchart of successful initiation of a trunking service in a handover process of an LTE common service according to a preferred embodiment of the disclosure. As shown in FIG. 6, a UE has created an LTE service. When the UE satisfies measurement report triggering conditions, the UE reports a measurement report message to a source Evolved nodeB (EnodeB, also called a base station). The source EnodeB performs measurement judgement, and sends a handover request to a Mobile Management Entity (MME). At this time, the UE initiates an LTE trunking service, and the UE sends a TConcurrentTrunkingRequest message to a network side on a DCCH and caches the TConcurrentTrunkingRequest message. After receiving the message, the network side sends a TConcurrentDelay message to the UE. The network side subsequently issues a reconfiguration handover message, and after being turned to a target cell, the UE sends a reconfiguration handover completion message on the target cell, then sends out the previously cached TConcurrentTrunkingRequest message on the DCCH, and executes a trunking service creation process subsequently. In FIG. 6, an S-EnodeB is short for the source Evolved nodeB, and a T-EnodeB is short for a target Evolved nodeB.

Figure 7:
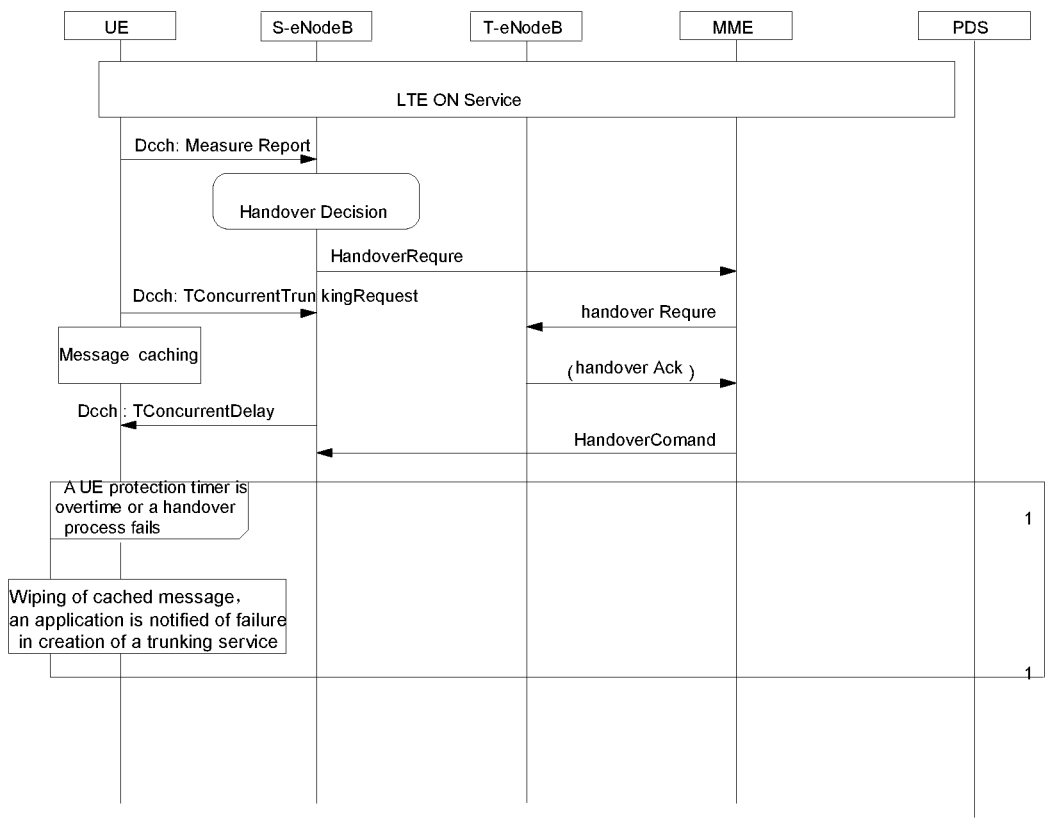
FIG. 7 is a flowchart of unsuccessful initiation of a trunking service in a handover process of an LTE common service according to a preferred embodiment of the disclosure.

FIG. 7 is a flowchart of unsuccessful initiation of a trunking service in a handover process of an LTE common service according to a preferred embodiment of the disclosure. As shown in FIG. 7, a UE has created an LTE service. When the UE satisfies measurement report triggering conditions, the UE reports a measurement report message to an S-EnodeB. The S-EnodeB performs measurement judgement, and sends a handover request to an MME. At this time, the UE initiates an LTE trunking service, and the UE sends a TConcurrentTrunkingRequest message to a network side on a DCCH and caches the TConcurrentTrunkingRequest message. When handover fails or a terminal monitoring trunking service creation timer is overtime, the cached TConcurrentTrunkingRequest message is wiped, and an upper application is notified of failure in creation of a trunking service.

Figure 8:
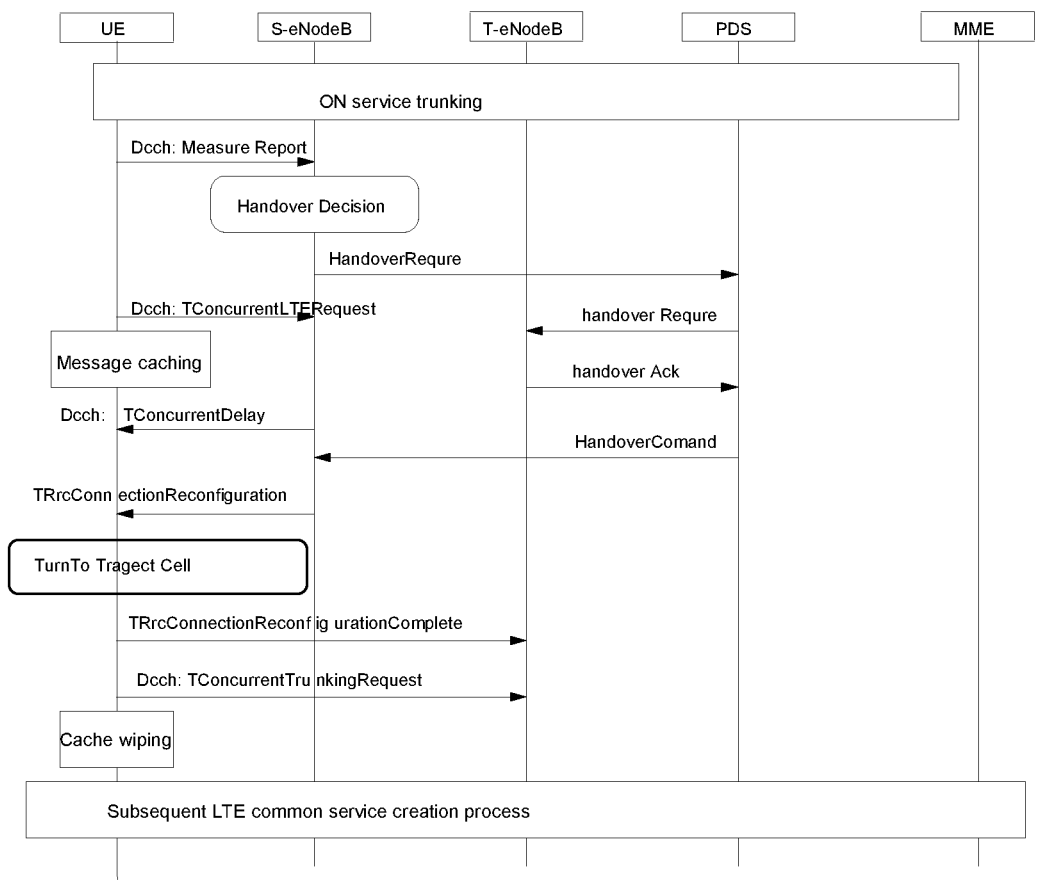
FIG. 8 is a flowchart of successful initiation of an LTE common service in a handover process of a trunking service according to a preferred embodiment of the disclosure.

FIG. 8 is a flowchart of successful initiation of an LTE common service in a handover process of a trunking service according to a preferred embodiment of the disclosure. As shown in FIG. 8, a UE has created an LTE service and is located at a talk user. When the UE satisfies measurement report triggering conditions, the UE reports a measurement report message to an S-EnodeB. The S-EnodeB performs measurement judgement, and sends a handover request to a Press-To-Talk (PTT) Dispatch Server (PDS). At this time, the UE initiates an LTE common service, and the UE sends a TConcurrentLTERequest message to a network side on a DCCH and caches the TConcurrentLTERequest message. After receiving the message, the network side sends a TConcurrentDelay message to the UE. The network side subsequently issues a reconfiguration handover message, and after being turned to a target cell, the UE sends a reconfiguration handover completion message on the target cell, then sends out the previously cached TConcurrentLTERequest message on the DCCH, and executes an LTE service creation process subsequently.

Figure 9:
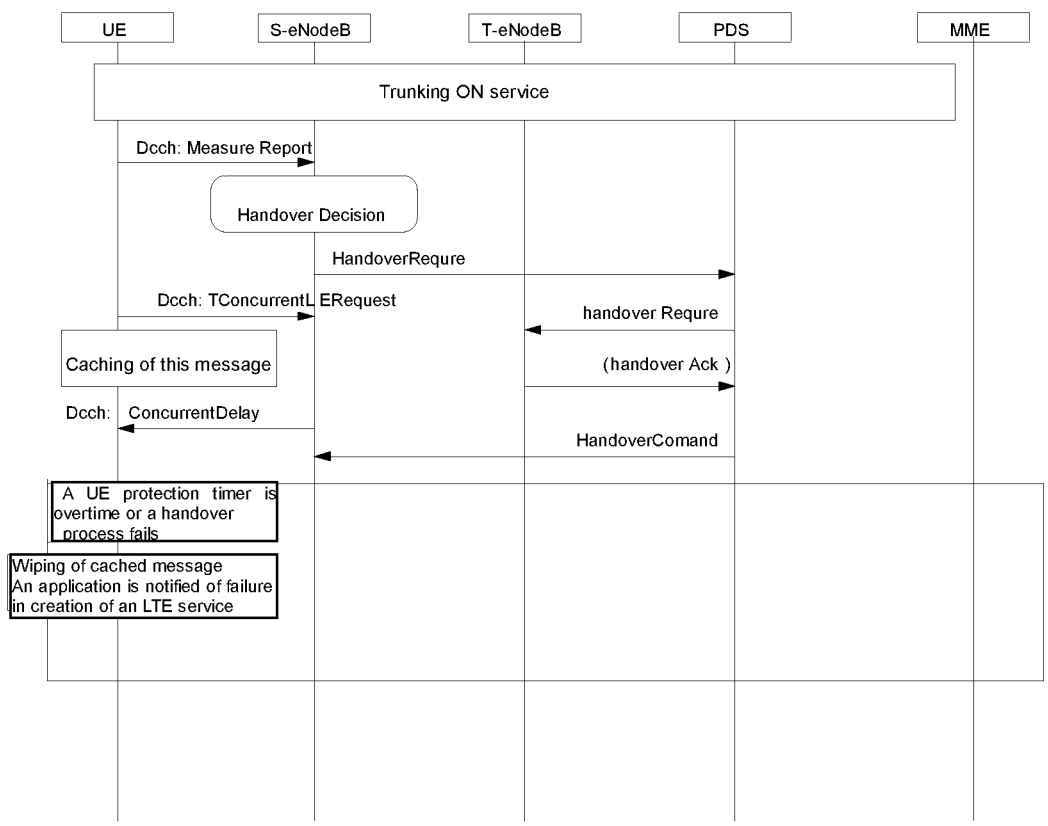
FIG. 9 is a flowchart of unsuccessful initiation of an LTE common service in a handover process of a trunking service according to a preferred embodiment of the disclosure.

FIG. 9 is a flowchart of unsuccessful initiation of an LTE common service in a handover process of a trunking service according to a preferred embodiment of the disclosure. As shown in FIG. 9, a UE has created a trunking service and is located at a talk user. When the UE satisfies measurement report triggering conditions, the UE reports a measurement report message to an S-EnodeB. The S-EnodeB performs measurement judgement, and sends a handover request to a PDS. At this time, the UE initiates an LTE common service, and the UE sends a TConcurrentLTERequest message to a network side on a DCCH and caches the TConcurrentLTERequest message. When handover fails or a terminal monitoring trunking service creation timer is overtime, the cached TConcurrentLTERequest message is wiped, and an upper application is notified of failure in creation of a trunking service.

Obviously, those skilled in the art should understand that all components or all steps in the disclosure can be realized by using a general calculation apparatus, can be centralized on a single calculation apparatus or can be distributed on a network composed of a plurality of calculation apparatuses. Optionally, they can be realized by using executable program codes of the calculation apparatuses. Thus, they can be stored in a storage apparatus and executed by the calculation apparatuses, or they are manufactured into each integrated circuit component respectively, or a plurality of components or steps therein are manufactured into a single integrated circuit component. Thus, the disclosure is not limited to a combination of any specific hardware and software.

The above is only the preferred embodiments of the present invention, and is not intended to limit the present invention. There can be various modifications and variations in the present invention for those skilled in the art. Any modifications, equivalent replacements, improvements and the like within the spirit and principle of the present invention shall fall within the protection scope of the present invention.

INDUSTRIAL APPLICABILITY

The technical solution provided by the present invention can be applied to a service processing process for wireless communications. By adopting the technical solution of delaying the creation of a service in a handover process, the problem that when handover is carried out, a UE cannot ensure that the service is initiated normally, thereby ensuring that the service which is initiated in the handover process can be initiated normally and is not affected because of the handover process.

The invention claimed is:

1. A method for processing a service of wireless communications, comprising:
    receiving, by a network side, a request message which is sent by a terminal and used for creating a service;
    notifying, by the network side, the terminal to delay the creation of the service after determining that the terminal is in a handover process; and
    receiving, by the network side, the request message which is resent by the terminal and creating the service, after the handover process is completed.

2. The method as claimed in claim 1, wherein receiving, by the network side, the request message which is sent by the terminal comprises:
    determining to carry out the handover process under a condition that the network side has created another service with the terminal; and
    receiving, by the network side in the handover process, the request message which is sent by the terminal.

3. The method as claimed in claim 2, wherein receiving, by the network side, the request message which is sent by the terminal comprises:
    receiving, by the network side through a Radio Resource Control, RRC, link of the other service, the request message which is sent by the terminal.

4. The method as claimed in claim 3, wherein the service is a trunking service, and the other service is a non-trunking service; or the service is a non-trunking service, and the other service is a trunking service.

5. The method as claimed in claim 2, wherein the service is a trunking service, and the other service is a non-trunking service; or the service is a non-trunking service, and the other service is a trunking service.

6. A method for processing a service of wireless communications, comprising:
    sending, by a terminal, a request message to a network side, wherein the request message is used for creating a service;
    receiving, by the terminal, a notice from the network side, and caching, by the terminal, the request message according to the notice to delay the creation of the service, wherein the notice is sent by the network side after determining that the terminal is in a handover process; and
    resending, by the terminal, the request message to the network side after the handover process is completed.

7. The method as claimed in claim 6, wherein sending, by the terminal, the request message to the network side comprises:
    sending, by the terminal, the request message to the network side in the handover process, wherein the handover process is carried out under a condition that the terminal has created another service with the network side.

8. The method as claimed in claim 7, wherein sending, by the terminal, the request message to the network side comprises:
    sending, by the terminal, the request message to the network side through a Radio Resource Control, RRC, link of the other service.

9. The method as claimed in claim 7, wherein the service is a trunking service, and the other service is a non-trunking service; or the service is a non-trunking service, and the other service is a trunking service.

10. The method as claimed in claim 6, wherein the service is a trunking service, and the other service is a non-trunking service; or the service is a non-trunking service, and the other service is a trunking service.

11. The method as claimed in claim 6, further comprising:
    deleting, by the terminal, the cached request message and notifying, by the terminal, that the creation of the service fails after the handover process fails or a protection timer is overtime.

12. An apparatus for processing service of wireless communications, located at a network side, the apparatus comprising:
    a receiving component, configured to receive a request message which is sent by a terminal and used for creating a service;
    a notification component, configured to notify the terminal to delay the creation of the service after determining that the terminal is in a handover process; and
    a creation component, configured to receive the request message which is resent by the terminal, and create the service, after the handover process is completed.

13. The apparatus as claimed in claim 12, wherein the receiving component is configured to determine to carry out the handover process under a condition that the network side has created another service with the terminal, and receive the request message which is sent by the terminal in the handover process.

14. The apparatus as claimed in claim 13, wherein the receiving component is configured to receive the request message which is sent by the terminal through a Radio Resource Control, RRC, link of the other service.

15. The apparatus as claimed in claim 13, wherein the service is a trunking service, and the other service is a non-trunking service; or the service is a non-trunking service, and the other service is a trunking service.

16. An apparatus for processing service of wireless communications, located at a terminal, the apparatus comprising:
    a sending component, configured to send a request message to a network side, wherein the request message is used for creating a service;
    a caching component, configured to receive a notice from the network side, and cache the request message by the terminal according to the notice to delay the creation of the service, wherein the notice is sent by the network side after determining that the terminal is in a handover process; and
    the sending component, configured to resend the request message to the network side after the handover process is completed.

17. The apparatus as claimed in claim 16, wherein the sending component is configured to send the request message to the network side in the handover process, wherein the handover process is carried out under a condition that the terminal has created another service with the network side.

18. The apparatus as claimed in claim 17, wherein the sending component is configured to send the request message to the network side through a Radio Resource Control, RRC, link of the other service.

19. The apparatus as claimed in claim 16, wherein the service is a trunking service, and the other service is a non-trunking service; or the service is a non-trunking service, and the other service is a trunking service.

20. The apparatus as claimed in claim 16, further comprising:
   a deletion component, configured to delete the cached request message by the terminal and notify that the creation of the service fails after the handover process fails or a protection timer is overtime.

* * * * *